(12) United States Patent
Noonan

(10) Patent No.: US 9,586,562 B1
(45) Date of Patent: Mar. 7, 2017

(54) WHEEL STOP

(71) Applicant: Bryan Noonan, Scottsdale, AZ (US)

(72) Inventor: Bryan Noonan, Scottsdale, AZ (US)

( * ) Notice: Subject to any disclaimer, the term of this patent is extended or adjusted under 35 U.S.C. 154(b) by 0 days.

(21) Appl. No.: 14/040,994

(22) Filed: Sep. 30, 2013

Related U.S. Application Data

(63) Continuation-in-part of application No. 13/285,915, filed on Oct. 31, 2011, now abandoned.

(51) Int. Cl.
*B60T 3/00* (2006.01)

(52) U.S. Cl.
CPC ..................................... *B60T 3/00* (2013.01)

(58) Field of Classification Search
CPC ..................................... B60T 1/14; B60T 3/00
USPC ......................................... 188/4 R, 5, 19, 32
See application file for complete search history.

(56) References Cited

U.S. PATENT DOCUMENTS

| | | | |
|---|---|---|---|
| 3,391,760 A * | 7/1968 | Gonser | 188/32 |
| 3,973,651 A * | 8/1976 | Garrett et al. | 188/32 |
| 4,120,384 A | 10/1978 | Choy | |
| 4,399,893 A * | 8/1983 | Switzer | 188/32 |
| 4,917,219 A * | 4/1990 | Henry | 188/32 |
| 5,046,587 A * | 9/1991 | Jones | 188/32 |
| 5,210,903 A * | 5/1993 | Horning | 16/18 R |
| 5,383,639 A * | 1/1995 | Byard | 248/346.11 |
| 5,427,339 A * | 6/1995 | Pauli et al. | 248/75 |
| 5,687,516 A * | 11/1997 | Sheehan et al. | 52/174 |
| D439,720 S * | 3/2001 | Lemon et al. | D34/27 |
| 6,250,613 B1 | 6/2001 | Koeske et al. | |
| D444,441 S * | 7/2001 | Bennett, Jr. | D12/217 |
| 7,581,623 B1 * | 9/2009 | Egnor | 188/36 |
| 2007/0200312 A1 * | 8/2007 | Chamberlin et al. | 280/124.116 |
| 2009/0065989 A1 | 3/2009 | Leonard | |
| 2009/0302514 A1 | 12/2009 | Grabarz et al. | |

* cited by examiner

*Primary Examiner* — Pamela Rodriguez
(74) *Attorney, Agent, or Firm* — Booth Udall Fuller, PLC

(57) ABSTRACT

Disclosed is a wheel stop configured to prevent the normal rotation of a wheel. The wheel stop may include a body having a top, a base, a front, and a backside. A wheel socket may be configured for receiving and removably holding at least a portion of the wheel therein, the wheel socket defined in the top of the body and having a bottom surface. The wheel stop may further include one of a lift member defined at the backside of the body, a plurality of feet spaced apart around an outer edge of the bottom of the body, and both.

11 Claims, 8 Drawing Sheets

WHEEL STOP

CROSS REFERENCE TO RELATED APPLICATION

This application is a continuation in part application of the earlier application entitled "Wheel Stop", Ser. No. 13/285,915, filed Oct. 31, 2011, now pending, the disclosure of which being hereby incorporated entirely herein by reference.

BACKGROUND

Technical Field

This document relates to a wheel rotation stop.

Background

Most supercenters, superstores, megastores, big-box stores, warehouse club stores, and supermarkets for example have a wide variety of shopping carts for the convenience of the shoppers. A common feature among the various types of shopping carts is wheels of various types, such as fixed, swivel, caster, or a combination thereof of wheels for example. Carts sometimes are fitted with four wheels.

These carts are for use by customers inside the shop for transport of merchandise to the check-out counter during shopping. Customers can then also use the carts to transport their purchased goods to their cars out in a parking lot. Typically, customers are allowed to leave the carts in the parking lot, and store personnel will return the carts to a storage area.

Most carts are made of metal or a combination of metal and plastic. Since parking lots are not usually completely level and are often sloped for water drainage purposes, carts have a tendency to roll on their own if left unattended. Sometimes this happens when a customer lets go of the cart to open a car door. This can be annoyance at best or a nightmare or liability issue at worst if a customer has a child or personal belongings like a purse in the cart or if the cart hits another vehicle in the parking lot.

SUMMARY

Aspects of this document relate to a wheel stop. These aspects may comprise, and implementations may include, one or more or all of the following components and steps.

In one aspect, a wheel stop is disclosed that is configured to prevent the normal rotation of a wheel. The wheel stop may include a body having a top, a base, a front, and a backside. A wheel socket may be configured for receiving and removably holding at least a portion of the wheel therein, the wheel socket defined in the top of the body and having a bottom surface. The wheel stop may further include: a lift member defined at the backside of the body; a plurality of feet spaced apart around an outer edge of the bottom of the body; or both.

Particular implementations may include one or more or all of the following.

The lift member may include an outwardly protruding, orthogonal flange.

The body may have a circular sector shape.

The base may be a flat base.

The base may include a flat rimmed base and an offset hub may be joined with the rimmed base through a plurality of radial ribs.

The radial ribs may be connected together with an annular rib between the hub and the rimmed base.

The bottom surface of the wheel socket may have a circular shape. As such, the wheel socket may be an inverted conical frustum.

A wheel ramp configured for receiving and directing at least a portion of the wheel there through to the wheel socket may be included. The wheel ramp may include a channeled, inclined ramp defined in an edge at the front of the body formed of spaced apart sidewalls and one of a flat and convex bottom surface.

The sidewalls of the ramp may be flared so that the ramp has a sector shape.

In another aspect, a wheel stop is disclosed that is configured to prevent the normal rotation of a wheel of a shopping cart so that the shopping cart can remain in a desired position without inadvertently rolling away. The wheel stop may include a body having a top, a base, a front, and a backside. A wheel socket configured for receiving and removably holding at least a portion of the wheel of the shopping cart therein may also be included. The wheel socket may be defined in the top of the body and may have a bottom surface. A plurality of feet may also be included spaced apart around an outer edge of the bottom of the body. A lift member may also be defined at the backside of the body.

Particular implementations may include one or more or all of the following.

The lift member may include an outwardly protruding, orthogonal flange.

The body may have a circular sector shape.

The base may be a flat base.

The base may include a flat rimmed base and an offset hub may be joined with the rimmed base through a plurality of radial ribs.

The radial ribs may be connected together with an annular rib between the hub and the rimmed base.

The bottom surface of the wheel socket may have a circular shape. As such, the wheel socket may be an inverted conical frustum.

A wheel ramp configured for receiving and directing at least a portion of the wheel there through to the wheel socket may be included. The wheel ramp may include a channeled, inclined ramp defined in an edge at the front of the body formed of spaced apart sidewalls and one of a flat and convex bottom surface.

The sidewalls of the ramp may be flared so that the ramp has a sector shape.

The foregoing and other aspects, features, and advantages will be apparent to those of ordinary skill in the art from the DESCRIPTION and DRAWINGS.

BRIEF DESCRIPTION OF DRAWINGS

Implementations will hereinafter be described in conjunction with the appended DRAWINGS (which are not necessarily to scale), where like designations denote like elements, and.

DESCRIPTION

Figure 1:
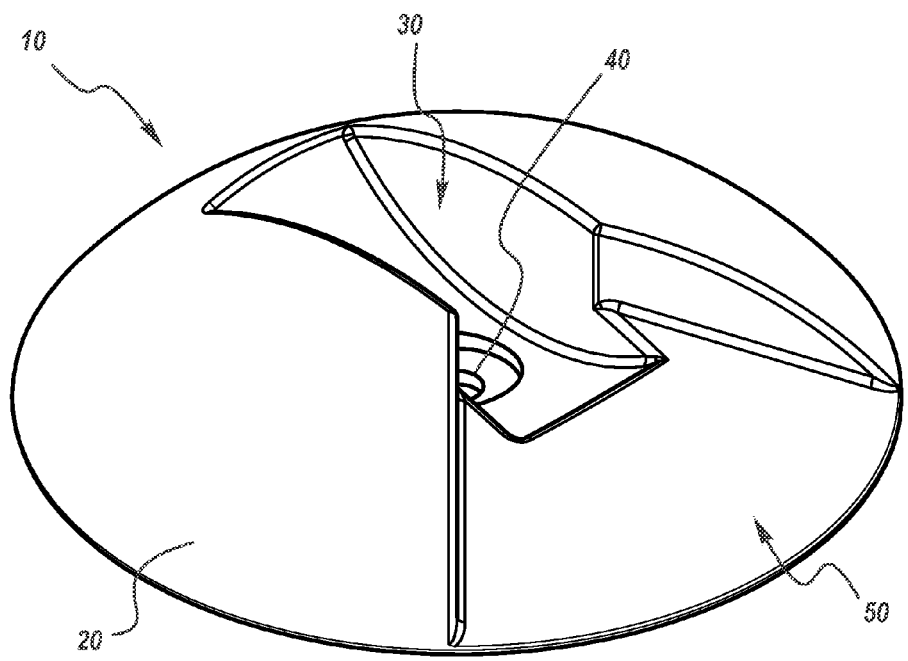
FIG. 1 is a top perspective view of a wheel stop implementation.
Figure 2:
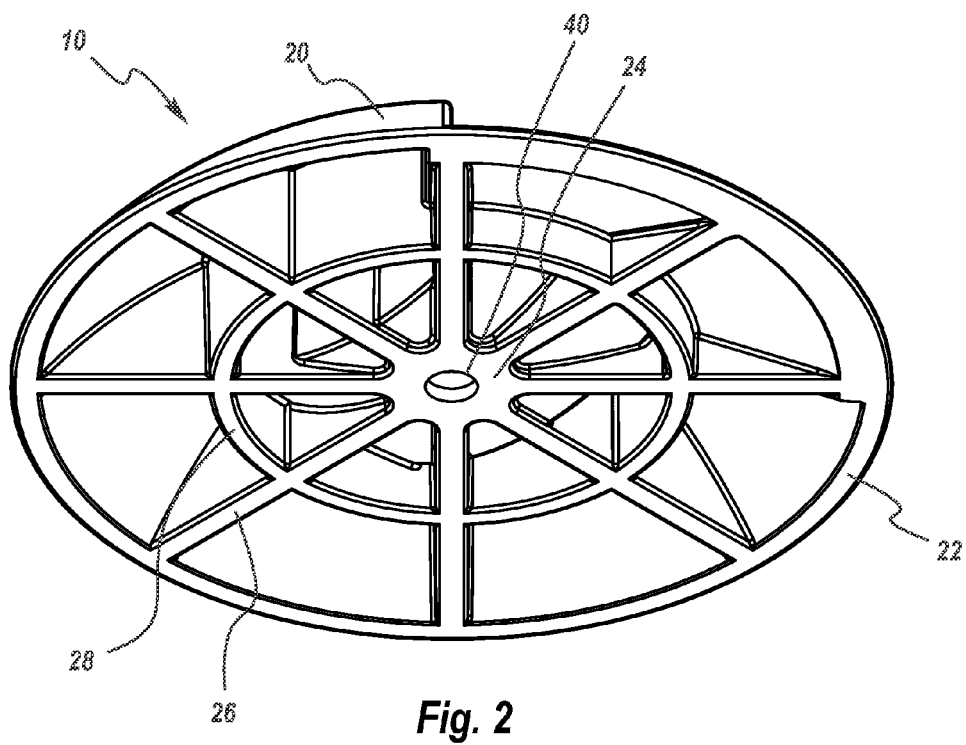
FIG. 2 is a bottom perspective view of the wheel stop implementation of FIG. 1.
Figure 3:
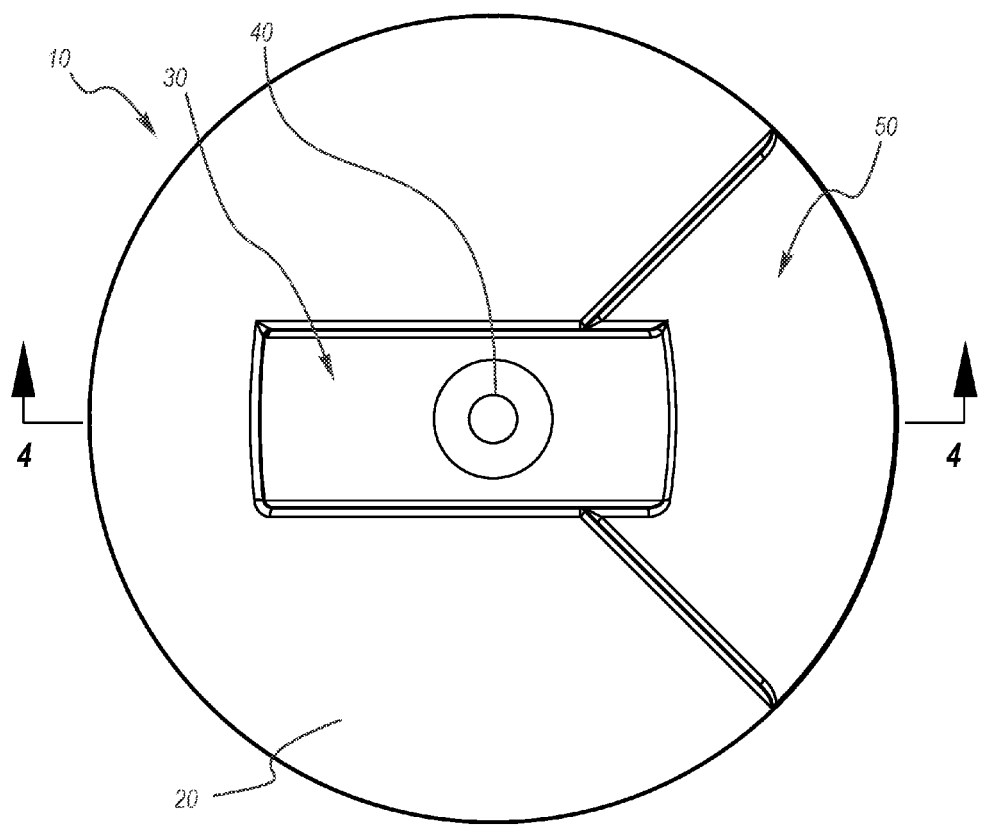
FIG. 3 is a top view of the wheel stop implementation of FIG. 1.
Figure 4:
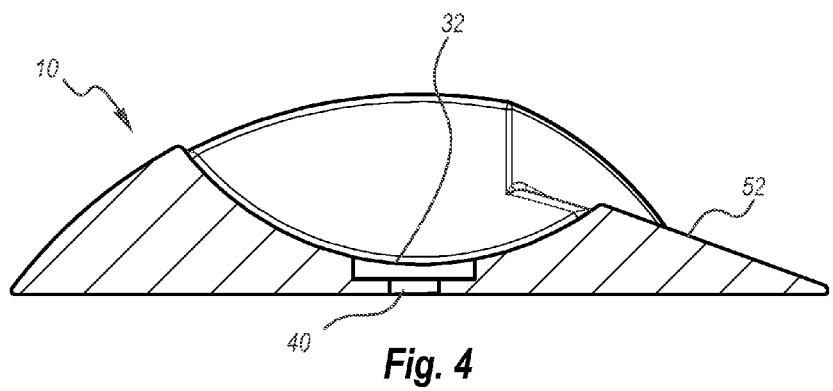
FIG. 4 is a cross-sectional side view of the wheel stop implementation of FIG. 1 taken along line 4-4 of FIG. 3.
Figure 5:
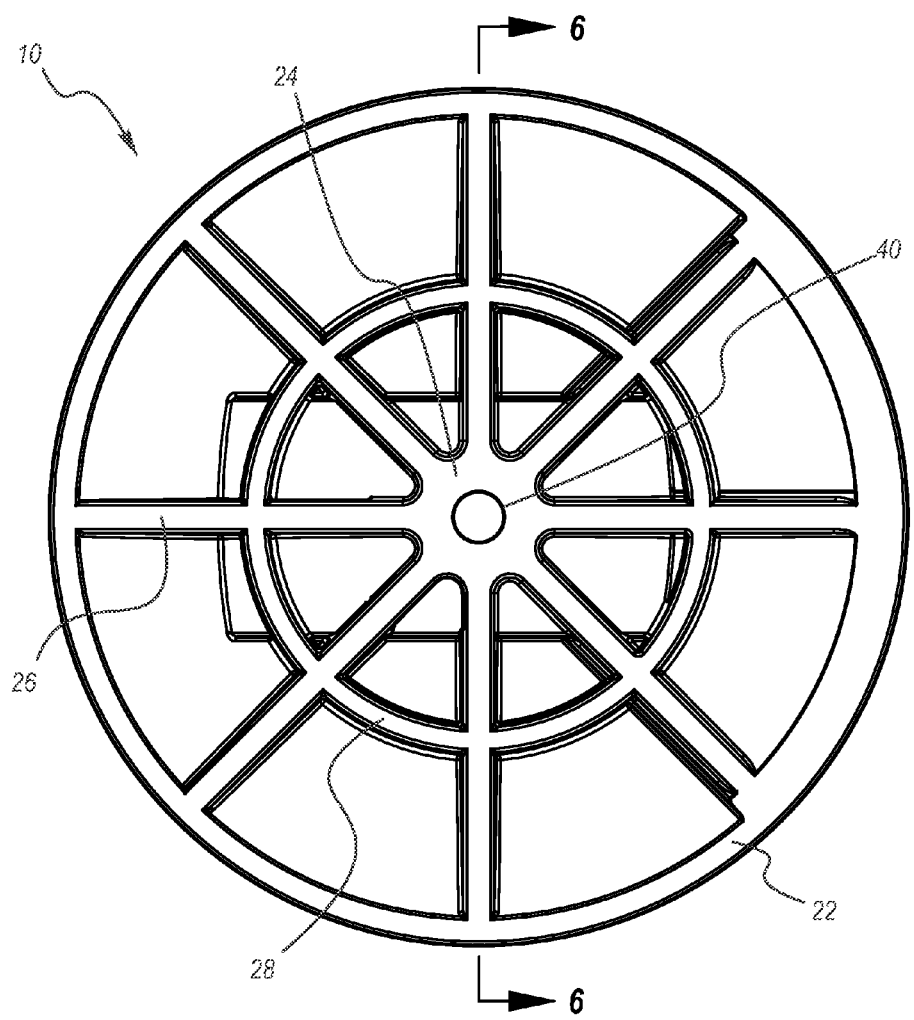
FIG. 5 is a bottom view of the wheel stop implementation of FIG. 1.
Figure 6:
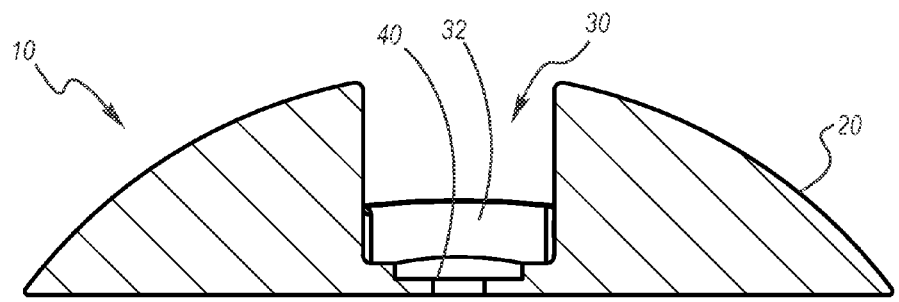
FIG. 6 is a cross-sectional side view of the wheel stop implementation of FIG. 1 taken along line 6-6 of FIG. 5.
Figure 7:
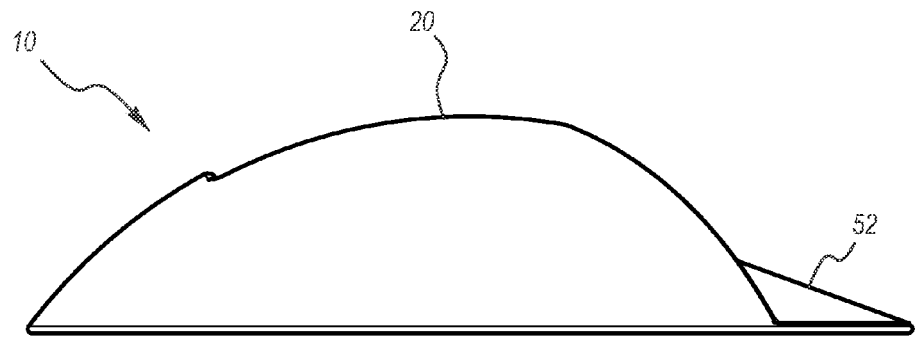
FIG. 7 is a side view of the wheel stop implementation of FIG. 1.
Figure 8:
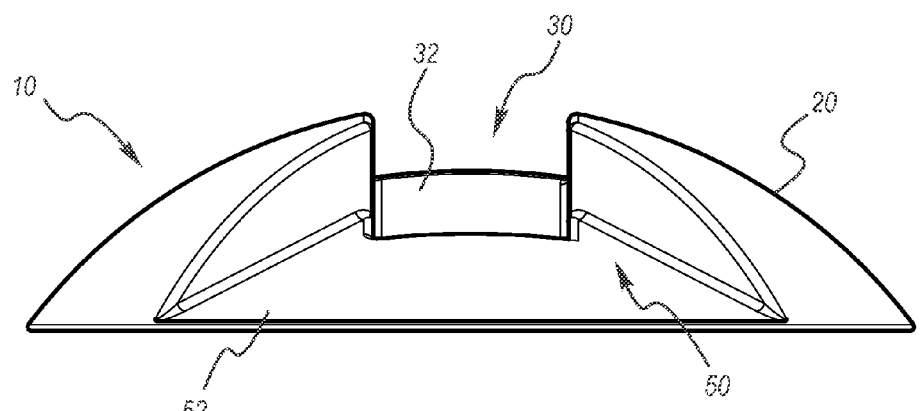
FIG. 8 is a front view of the wheel stop implementation of FIG. 1.
Figure 9:
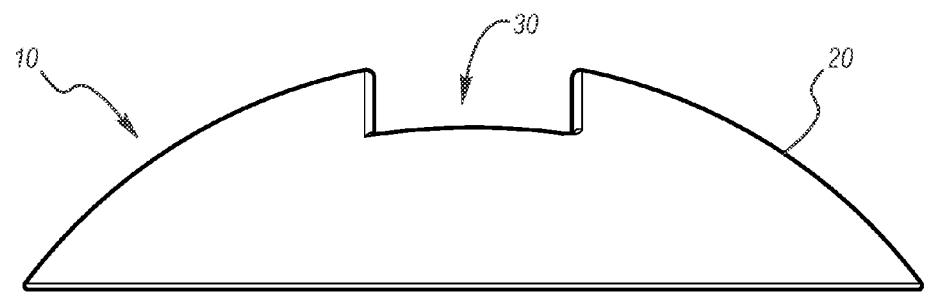
FIG. 9 is a back view of the wheel stop implementation of FIG. 1.

This document features a wheel stop. There are many features of the foregoing disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

In describing implementations, the following terminology will be used in accordance with the definitions and explanations set out below. Notwithstanding, other terminology, definitions, and explanations may be found throughout this document as well.

"Shopping cart" refers to any cart of any type by any name, such as a Cart, a Trolley, a Barrae, a Carriage, a Buggy, a Bascart; a Wagon, a Caddy, and the like. A shopping cart will have at least one wheel (often four wheels for example).

Structure

There are a variety of wheel stop implementations for use with shopping carts. Notwithstanding, turning to FIGS. 1-9 and for the exemplary purposes of this disclosure, wheel stop 10 is shown. Wheel stop 10 includes body 20, wheel socket 30, fastener hole 40, and wheel ramp 50.

Body 20 may be any three dimensional curvilinear shape. For example, body 20 could have a spherical dome shape. A dome (or spherical cap) is a closed geometrical surface which can be obtained by sectioning off a portion of a sphere with an intersecting plane (the region of a sphere which lies above the intersecting plane). If the plane passes through the center of the sphere, the dome or spherical cap is a called a hemisphere.

Dome shaped body 20 may include flat disk shaped, rimmed base 22 which is joined to a convex surface whose curvature is substantially uniform and which has a circular boundary. This circular boundary joins with the rimmed base 22. Rimmed base 22 is also connected to a central hub 24 through a plurality of radial ribs 26. Radial ribs are connected together with an annular rib 28 between the hub 24 and the rimmed base 22. Rimmed base 22, hub 24, radial ribs 26, and annular rib 28 all provided structural support to body 20 of wheel stop 10, not only for the stress of wheels of shopping carts, but for the stress of vehicles that may drive over a wheel stop 10.

Wheel socket 30 is a recessed channel defined in the top of body 20. Socket 30 is configured for receiving and removably holding a wheel of a shopping cart. As such, socket 30 has a substantially mating shape and configuration to that of at least a portion of a wheel of a shopping cart. Socket 30 is formed of spaced apart parallel sidewalls defined in body 20 large enough to accommodate the width of a wheel and an inward-curving (concave) bottom surface 32. For example, the bottom surface 32 has a circular arc shape (a segment of the circumference of a circle) corresponding to a segment of the circumference of a wheel. Thus, socket 30 can prevent the normal rotation of a shopping cart wheel engaged therein so that the shopping cart can remain in a desired position without inadvertently rolling away.

Fastener hole 40 is optional and provides another manner in which to install a wheel stop 10. Fastener hole 40 is a through hole running from the bottom surface 32 of socket 30 out through hub 24. A counter bore may be defined in the bottom surface 32 of socket 30 surrounding fastener hole 40 to allow the head of a fastener to seat flush with the bottom surface 32 so as to not interfere with a wheel of a shopping cart.

Wheel ramp 50 is defined in an edge of the body 22 and is a channeled, inclined ramp that has a truncated circular sector shape. A circular sector is the portion of a disk enclosed by two radii and an arc. A sector with a central angle of 180° is called a semicircle. Sectors with other central angles include quadrants (90°), sextants (60°) and octants (45°). Wheel ramp 50 may have a quadrant or sextant shape for example. Ramp 50 is formed of flared or splayed apart inclined sidewalls defined in body 20 and either a flat or an outward-curving (convex) bottom surface 52. The arced entrance of ramp 50, like the circular boundary of the convex surface of body 20, is joined with the rimmed base 22. The exit of ramp 50 is truncated where the ramp sidewalls join/merge into the sidewalls of socket 30. Thus, ramp 50 is splayed or flared so that a wheel can enter ramp 50 more easily and then be easily and automatically directed up into socket 30.

Other Implementations

Many additional implementations are possible.

For the exemplary purposes of this disclosure, although there are a variety of wheel stop implementations, other implementations may have a solid base instead of a hollow rimmed base with a hub and interconnecting ribs.

For the exemplary purposes of this disclosure, although there are a variety of wheel stop implementations, other implementations may not include fastener hole.

For the exemplary purposes of this disclosure, although there are a variety of wheel stop implementations, other implementations may use a fastener hole without a fastener so that it functions as a drain hole so that water does not remain caught in socket 30. In addition to fastener hole 40 or alternatively, other drain hole or holes may be provided in socket 30 or elsewhere on body 20.

For the exemplary purposes of this disclosure, although there are a variety of wheel stop implementations, other implementations may have bodies of any three dimensional curvilinear shape. For example, instead of a body having a spherical dome shape, the bodies may be spheroidal (including oblate spheroidal or prolate spheroidal) domes, obtained by sectioning off a portion of a spheroid so that the resulting dome is symmetrical (having an axis of rotation), or ellipsoidal (including the triaxial ellipsoidal) domes. Bodies could also have a truncated dome shape. For example, bodies could have a spherical segment shape—the solid defined by cutting a sphere with a pair of parallel planes (a spherical cap with the top truncated).

For the exemplary purposes of this disclosure, although there are a variety of wheel stop implementations, other implementations may have a ramp that is formed of spaced apart parallel sidewalls defined in body 20 large enough to accommodate the width of a wheel as opposed to flared or splayed apart sidewalls. The ramp side walls would be directly in line with the socket sidewalls and provide a single path.

For the exemplary purposes of this disclosure, although there are a variety of wheel stop implementations, other implementations may not include a ramp. Instead they would just have a wheel socket.

For the exemplary purposes of this disclosure, although there are a variety of wheel stop implementations, turning to FIGS. 14-17, wheel stop 100 is disclosed. Wheel stop 100 is similar to wheel stop 10 and the other wheel stop implementations described above.

Wheel stop 100 includes body 120, wheel socket 130, wheel ramp 150, lift member 160, and feet 170-172.

Body 120 may be any three dimensional curvilinear shape. For example, body 120 could have a circular sector shape. A circular sector or circle sector is the portion of a disk enclosed by two radii (lines) and an arc. The circular sector has a central angle.

Alternatively, body 120 could have a truncated circular sector shape or a rounded circular sector shape or a truncated and rounded circular sector shape. For example, wheel stop 100 depicted in FIG. 14 has a rounded circular sector shape.

Sector shaped body 120 could define a sector with a central angle of 45 degrees to 180 degrees for example. As a specific example, sector shaped body 120 could be a semicircular shaped body and define a sector with a central angle of 180 degrees. As another specific example, sector shaped body 120 could be a quadrant shaped body and define a sector with a central angle of 90 degrees. As still another specific example, sector shaped body 120 could be a sextant shaped body and define a sector with a central angle of 60 degrees. As yet another specific example, sector shaped body 120 could be an octant shaped body and define a sector with a central angle of 45 degrees.

Sector shaped body 120 may include flat, rimmed base 122 that is joined to a surface which has an arc for a boundary. An arc is a closed segment of a differentiable curve in the two-dimensional plane. For the exemplary purposes of this disclosure, the arc may be a circular arc (i.e., a segment of a circle's circumference (boundary) since the circle is considered to be a disc).

This arc shaped or curved boundary joins with the rimmed base 122. Rimmed base 122 is also connected to an offset or off-center hub 124 through a plurality of radial ribs 126. Radial ribs are connected together with an annular rib 128 between the hub 124 and the rimmed base 122.

Rimmed base 122, hub 124, radial ribs 126, and annular rib 128 all provided structural support to body 120 of wheel stop 100, not only for the stress of wheels of shopping carts, but for the stress of vehicles that may drive over a wheel stop 100.

Lift member 160 is configured to aid in the placement and removal of wheel stop 100 on a parking lot surface or other surface for example. Lift member 160 may be an outwardly protruding flange or projection connected to the backside of body 120 (e.g. the upper backside of body 120). For example, lift member 160 may be orthogonal (at 90 degrees to) with respect to the backside of body 120. Specifically, since wheel stop 100 has a relatively flat bottom surface, it sits close to the ground. A user can grip wheel stop 100 with fingers by socket 130 and lift member 160 and easily place down or lift and remove wheel stop on the ground surface without the sliding wheel stop 100 on the ground and scraping the tips of the fingers or fingernails on the ground surface trying to pick it up, or damaging painted fingernails, or the like.

Feet 170-172 are connected to and spaced around rimmed base 122 and slightly hold wheel stop 100 above a surface. Feet 170-172 may be solid or may partially hollow. Feet 170-172 provide structural support to body 120 of wheel stop 100. Specifically, by having three spaced apart feet, wheel stop 100 is better able accommodate surfaces that are irregular and not flat or that have debris or small rocks thereon which would be common for parking lots for example. Feet 170-172 also can grip the surface to help keep wheel stop 100 stationary on a surface without having to bolt or glue wheel stop to the ground. As such, feet could also include gripping pads coupled to or integrally formed thereon or could define a series of ridges or bumps.

Wheel socket 130 is a recessed hole defined in the top of body 120 above the hub 124. The bottom surface of socket 130 has a circular shape of a diameter that is smaller the circular shaped opening of socket 130 such that socket 130 has an angled sidewall. For example, wheel socket 130 may be an inverted conical frustum defined in the top of the body 120. A frustum is the portion of a solid (in this case a cone) that lies between two parallel planes cutting it. Socket 130 is configured for receiving and removably holding a wheel of a shopping cart. As such, socket 130 has a shape and configuration to that of at least a portion of a wheel of a shopping cart. Thus, socket 130 can prevent the normal rotation of a shopping cart wheel engaged therein so that the shopping cart can remain in a desired position without inadvertently rolling away.

Wheel ramp 150 is defined in an edge of the body 122 and is a channeled, inclined ramp that has a circular sector shape or a truncated circular sector shape. Ramp 150 is formed of flared or splayed apart inclined sidewalls defined in body 120 and either a flat or an outward-curving (convex) bottom surface. The arced entrance of ramp 150, like the circular boundary of the surface of body 120, is joined with the rimmed base 122. Thus, ramp 150 is splayed or flared so that a wheel can enter ramp 150 more easily and then be easily and automatically directed up into socket 130.

Further implementations are contemplated.

Specifications, Materials, Assembly, and Manufacture

It will be understood that implementations are not limited to the specific components disclosed herein, as virtually any components consistent with the intended operation of a wheel stop implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a wheel stop implementation. Implementations are not limited to uses of any specific components, provided that the components selected are consistent with the intended operation of a wheel stop implementation.

Accordingly, the components defining any wheel stop implementation may be formed of any of many different types of materials or combinations thereof that can readily be formed into shaped objects provided that the components selected are consistent with the intended operation of a wheel stop implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Various wheel stop implementations may be manufactured using conventional procedures as added to and improved upon through the procedures described here. Some components defining wheel stop implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a fastener, a nut, a screw, a nail, a rivet, a pin, and/or the like), wiring, any combination thereof, and/or the like for example, depending on, among other considerations, the particular material forming the components.

Use

Implementations of a wheel stop are particularly useful for shopping carts and parking lot applications as explained. However, implementations are not limited to these particular uses. Rather, any description relating to shopping carts and parking lot applications is for the exemplary purposes of this disclosure, and implementations may also be used for other wheeled apparatuses (e.g., old cars, cars, trucks, etc.) in a variety of other applications (e.g., long-term storage, garages, lots, shows, etc.) with similar results.

In describing the use of wheel stop implementations further and for the exemplary purposes of this disclosure, reference is made to FIGS. 10-13.

Figure 10:
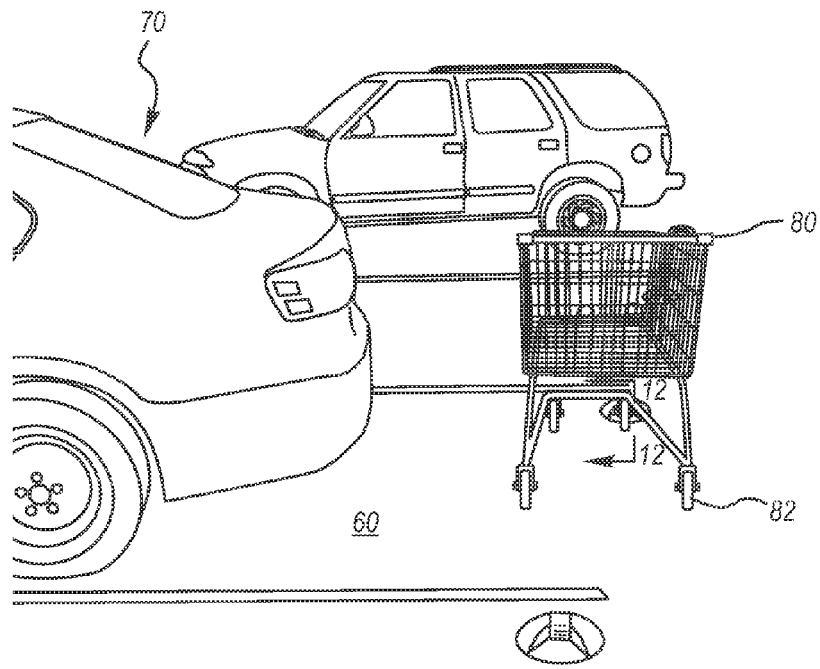
FIG. 10 is an in use perspective view of the wheel stop implementation of FIG. 1 in a parking lot.
Figure 11:
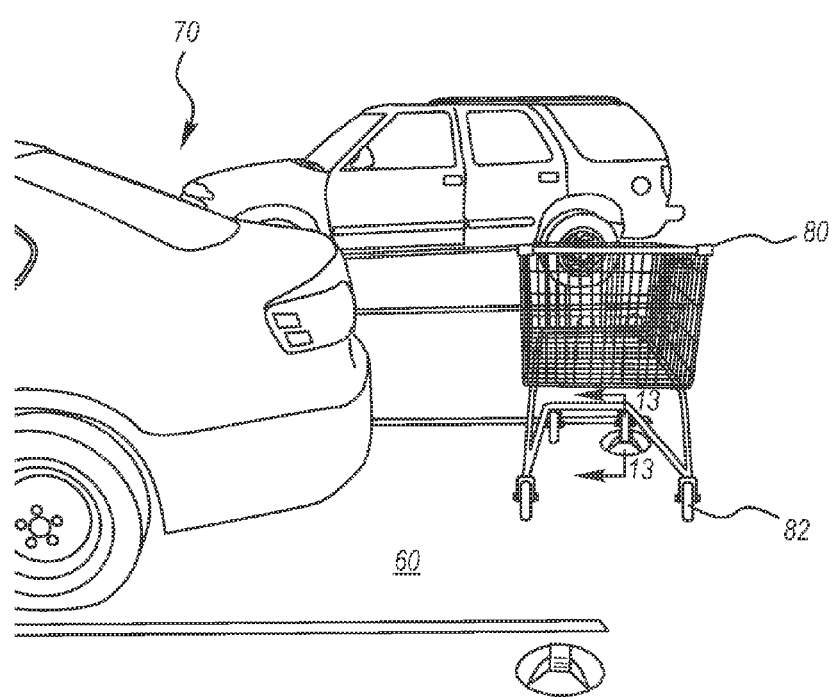
FIG. 11 is an in use perspective view of the wheel stop implementation of FIG. 1 in a parking lot.
Figure 12:
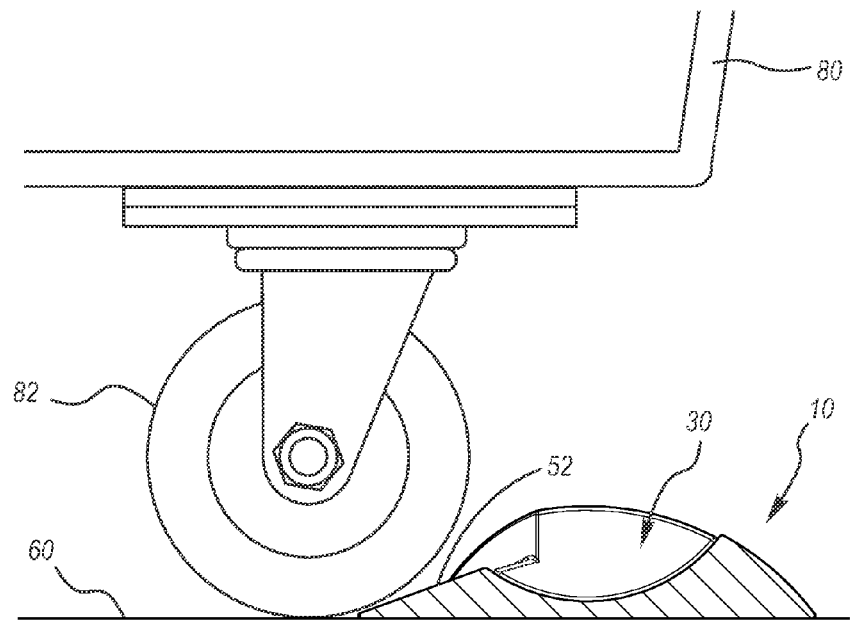
FIG. 12 is a cross-sectional side view of the wheel stop implementation of FIG. 1 taken along line 12-12 of FIG. 10.
Figure 13:
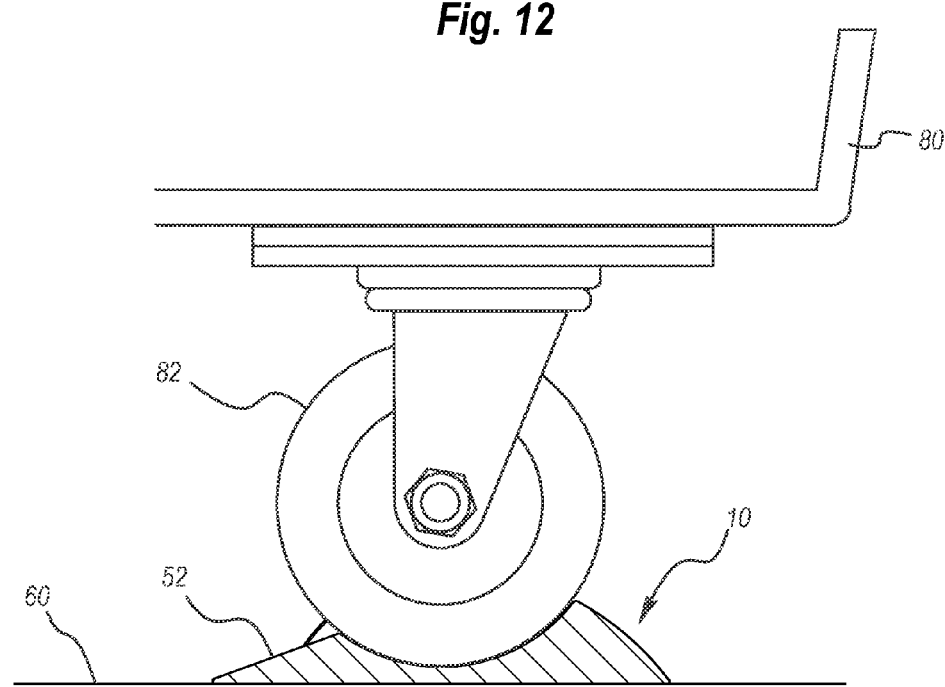
FIG. 13 is a cross-sectional side view of the wheel stop implementation of FIG. 1 taken along line 13-13 of FIG. 11.
Figure 14:
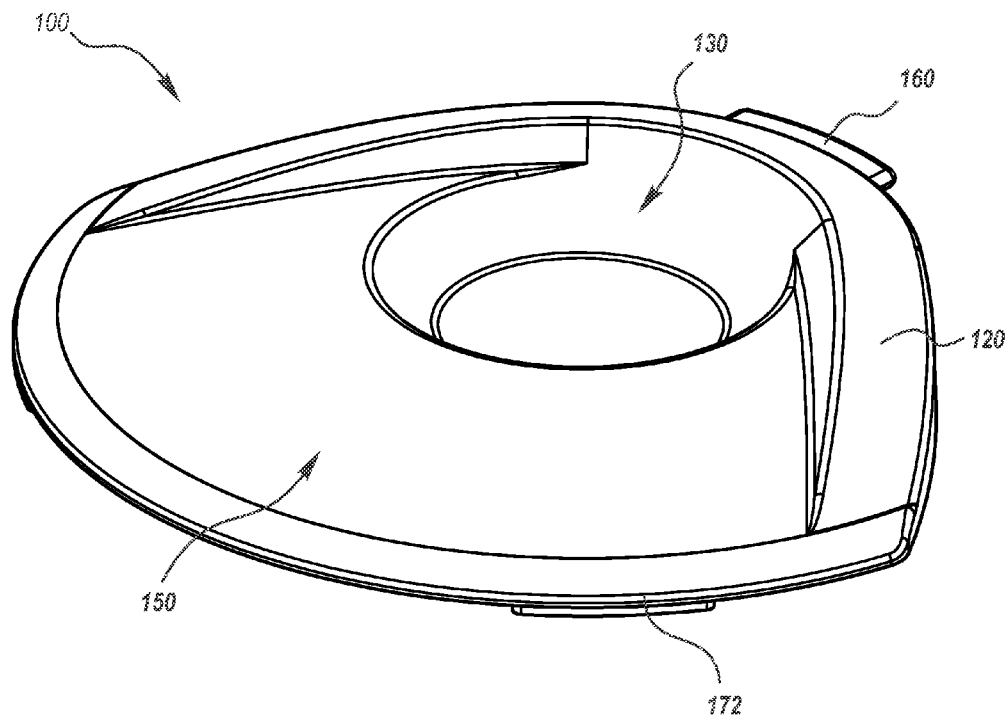
FIG. 14 is a top perspective view of another wheel stop implementation.
Figure 15:
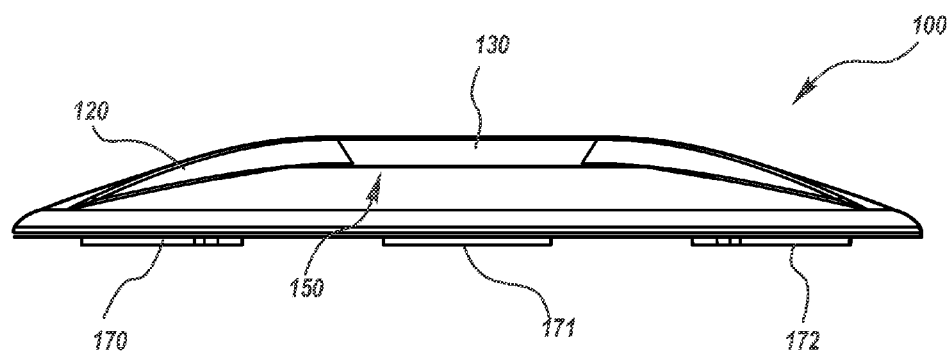
FIG. 15 is a front view of the wheel stop implementation of FIG. 14.
Figure 16:
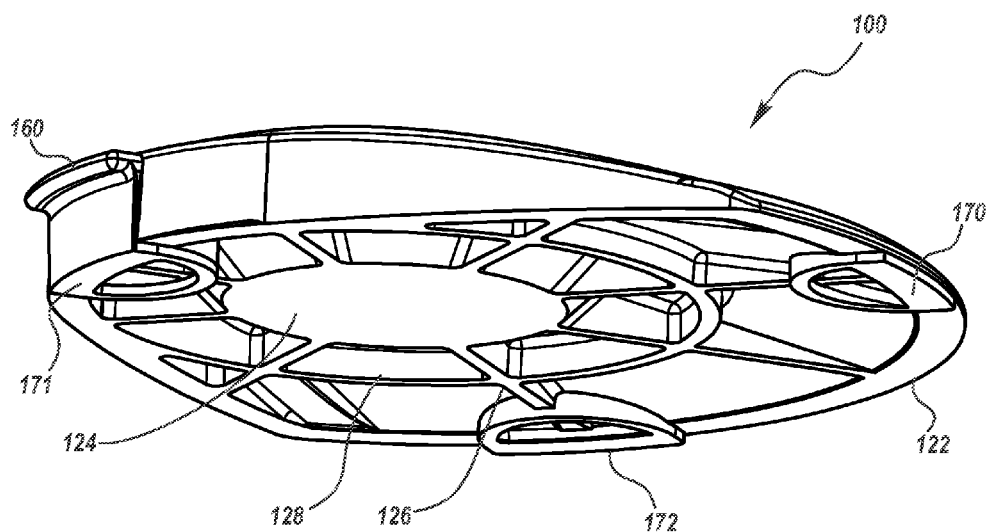
FIG. 16 is a bottom perspective view of the wheel stop implementation of FIG. 14.
Figure 17:
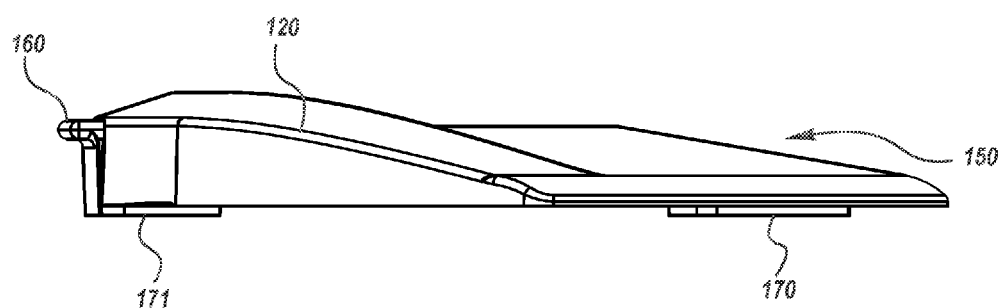
FIG. 17 is a side view of the wheel stop implementation of FIG. 14.

Wheel stops 10 may be installed in parking lots for example in a variety of ways. Typically parking lots 60 comprise asphalt or cement surfaces. Wheel stops 10 can be coupled to the surface of parking lot 60 with any appropriate adhesive that can bond the bases 22 of wheel stops 60 to the asphalt or cement surface for example. In addition to adhesive or alternatively, fasteners may be used to fasten wheel stops 60 to the concrete or asphalt or other surface using fastener holes 40. Because of their low profile and small size, wheel stops 10 can easily be driven over and they, therefore, can be installed at any strategic locations of parking lot 60, such at the openings of painted parking spaces as depicted in FIGS. 10-11. One or more wheel stops 10 could be installed at each parking space for example to give the customer different options to safely and removably retain shopping cart 80 in a desired location depending upon where the customer desires to access and load the vehicle. As depicted in FIGS. 10-11 for example, one wheel stop 10 is installed at the opening of each parking space in parking lot 60.

Once installed in parking lot 60, wheel stops 10 are ready for use. As a customer approaches the vehicle 70 to unload the shopping cart 80, the customer can dock the cart 80 in wheel stop 10 so that the shopping cart 80 can safely and securely remain in a desired position without inadvertently rolling away. This may be accomplished in the following manner.

Any wheel 82 of shopping cart 80 is brought to the entrance of ramp 50 by the customer. Then as the customer continues to push the cart forward, because of the flared entrance, wheel 82 can enter ramp 50 from a number of different directions and then can be easily and automatically directed/funneled up the ramp surface 52 between the ramp sidewalls to socket 30. As wheel 82 continues to move forward, a portion of wheel 80 engages in socket 30 between the spaced apart parallel sidewalls defined in body 20 and with the bottom surface 32 and further normal rotation of wheel 82 is prevented. After cart 80 is unloaded, the customer can reverse the foregoing steps by pulling the cart 80 backwards so that the portion of wheel 80 in socket 30 between the spaced apart parallel sidewalls defined in body 20 and on the bottom surface 32 disengages and moves down ramp surface 52 out of ramp 50. Then, the cart 80 can be moved by the customer or store personnel to any other desired location so that customer can remove vehicle 70 from the parking space in parking lot 60.

Thus, wheel stop 10 provides a useful, safe, secure, and low profile way to keep shopping carts from inadvertently rolling when left unattended by a customer or store personnel, such as when a customer lets go of the cart to open a car door. The customer does not have to worry about chasing after a cart that would otherwise be rolling away and does not have to deal with the liability and expense that can come from a cart rolling into their own car or another customer's car in the parking lot.

In places where the description above refers to particular implementations, it should be readily apparent that a number of modifications may be made without departing from the spirit thereof and that these implementations may be alternatively applied. The presently disclosed implementations are, therefore, to be considered in all respects as illustrative and not restrictive.

The invention claimed is:

1. A wheel stop configured to prevent the normal rotation of a wheel, the wheel stop comprising:
    a body having a top, a base, a front, and a backside;
    a wheel socket configured for receiving and removably holding at least a portion of the wheel therein, the wheel socket defined in the top of the body and having a bottom surface;
    only three feet spaced apart around an outer edge of the bottom of the body; and a single wheel ramp configured for receiving and directing at least a portion of the wheel there through to the wheel socket, the wheel ramp comprising a channeled, inclined ramp defined in an edge at the front of the body formed of spaced apart sidewalls and one of a flat and convex bottom surface, wherein the sidewalls of the ramp are flared at an angle from 60 to 180 degrees so that the ramp has a sector shape.

2. The wheel stop of claim 1 wherein the body has a circular sector shape.

3. The wheel stop of claim 2 wherein the base is a flat base.

4. The wheel stop of claim 2 wherein the base comprises a flat rimmed base, and wherein an off-center hub is joined with the rimmed base through a plurality of radial ribs.

5. The wheel stop of claim 4 wherein the radial ribs are connected together with an annular rib between the hub and the rimmed base.

6. The wheel stop of claim 1 wherein the bottom surface of the wheel socket has a circular shape.

7. The wheel stop of claim 6 wherein the wheel socket comprises an inverted conical frustum.

8. The wheel stop of claim 1 wherein the sidewalls of the ramp are flared at an angle from 90 to 180 degrees.

9. The wheel stop of claim 1 wherein the sidewalls of the ramp are flared at an angle from 110 to 150 degrees.

10. A wheel stop configured to prevent the normal rotation of a wheel of a shopping cart so that the shopping cart can remain in a desired position without inadvertently rolling away, the wheel stop consisting of:
  a body having a top, a base, a front, and a backside;
  a wheel socket configured for receiving and removably holding at least a portion of the wheel of the shopping cart therein, the wheel socket defined in the top of the body and having a bottom surface;
  only three feet spaced apart around an outer edge of the bottom of the body;
  a lift member defined at the backside of the body; and
  a single wheel ramp configured for receiving and directing at least a portion of the wheel there through to the wheel socket, the wheel ramp comprising a channeled, inclined ramp defined in an edge at the front of the body formed of spaced apart sidewalls and one of a flat and convex bottom surface, wherein the sidewalls of the ramp are flared at an angle from 60 to 180 degrees so that the ramp has a sector shape.

11. The wheel stop of claim 10 wherein the sidewalls of the ramp are flared at an angle from 110 to 150 degrees.

* * * * *